United States Patent
Martschink et al.

(12)
(10) Patent No.: US 6,510,326 B1
(45) Date of Patent: Jan. 21, 2003

(54) COMMUNICATION DEVICE WITH OPERATION MODE SELECTION ACCORDING TO ITS POSITION IN RELATION TO AN INDEPENDENT REFERENCE SYSTEM

(75) Inventors: Volker Martschink, Wiesbaden (DE); Klaus Pai, Hohenstein (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/441,012

(22) Filed: Nov. 16, 1999

(30) Foreign Application Priority Data

Nov. 28, 1998 (DE) .......................................... 198 55 037

(51) Int. Cl.⁷ ............................. H04B 1/38; H04M 1/00
(52) U.S. Cl. .......................... 455/550; 455/575; 455/90
(58) Field of Search ......................... 458/550; 455/575, 455/90; 379/433.02; 381/107

(56) References Cited

U.S. PATENT DOCUMENTS

| | | | | |
|---|---|---|---|---|
| 4,846,954 A | * | 7/1989 | Ryan et al. .................... 33/366 |
| 5,146,501 A | * | 9/1992 | Spector ........................ 381/25 |
| 5,224,151 A | * | 6/1993 | Bowen et al. ................. 379/58 |
| 6,115,620 A | * | 9/2000 | Colonna et al. ............. 455/469 |

* cited by examiner

*Primary Examiner*—Thanh Cong Le
*Assistant Examiner*—Andrew T Harry
(74) *Attorney, Agent, or Firm*—Susan L. Lukasik; Terri S. Hughes

(57) ABSTRACT

In a communication device (100) with an earpiece (110) and a microphone (120), there is a sensor (130) relating a first connection line (105) from the earpiece (110) to the microphone (120) on a system (200, 300) which is independent of the device and of the person using it, such as the earth's gravitational field, and which selects the operating mode QUIET (1) or LOUD (2) of the communication device in accordance with this. The sensor (130) switches the communication device (100) to QUIET when the angle (230) between the connecting line (105) and the plumbline (205) of the gravitational field basically corresponds to the angle (330) between a second connecting line between the ear (310) and the mouth (320) of a person (300) who is authorized to make the call, so as to bar other persons (400) who are in the vicinity (X2) from hearing the output from the communication device loudspeaker (110).

18 Claims, 2 Drawing Sheets

COMMUNICATION DEVICE WITH OPERATION MODE SELECTION ACCORDING TO ITS POSITION IN RELATION TO AN INDEPENDENT REFERENCE SYSTEM

FIELD OF THE INVENTION

The present invention relates to communication devices in general and portable units with an electro-acoustic converter in particular.

BACKGROUND OF THE INVENTION

In a conversation between two partners A and C over a communication system (e.g., telephone, radio) both partners A and C must be able to understand each other acoustically. There are conversation situations where a further person B is situated near to A.

In a first case, person B is excluded at least in part from the conversation when C is speaking about matters which concern A but not B. B can hear A but should not be able to hear C. In a second case, B is invited to take part in the conversation and listens to A as well as to C.

The system terminal device on the side of persons A and B is (i) in the first case set to modus QUIET (the speaker at A's ear is set to a low volume) and (ii) in the second case is set to modus LOUD (a high volume which both A and B can hear).

A portable personal communication device is known from patent number EP 0564 160 B1 (Bowen et al, German translation DE 693 18 613 T2) which can work both in earpiece mode with an ear coupling and in open loudspeaker mode or loud telephone type device mode, switching automatically between the two modes based on a continuous measurement of the distance between the listener and audio output unit. This document also further justifies the need for both modes of operation.

A portable radio is known from JP 9162772 A (Suzuki et al), in which during operation an infrared sensor determines the distance between user and radio and sets the speaker volume level as a function of this distance. The setting of the volume also serves, for example, to protect the listener from excessively high volumes.

The switch-over between the operating modes is determined according to the distance head-to-device, and thus the space therebetween. Environmental influences (for example, changing dielectric constants, further infrared sources) could effect the mode change.

There is a task of the invention to design a communication device which avoids that disadvantage.

SHORT DESCRIPTION OF THE DRAWINGS

Figure 1:
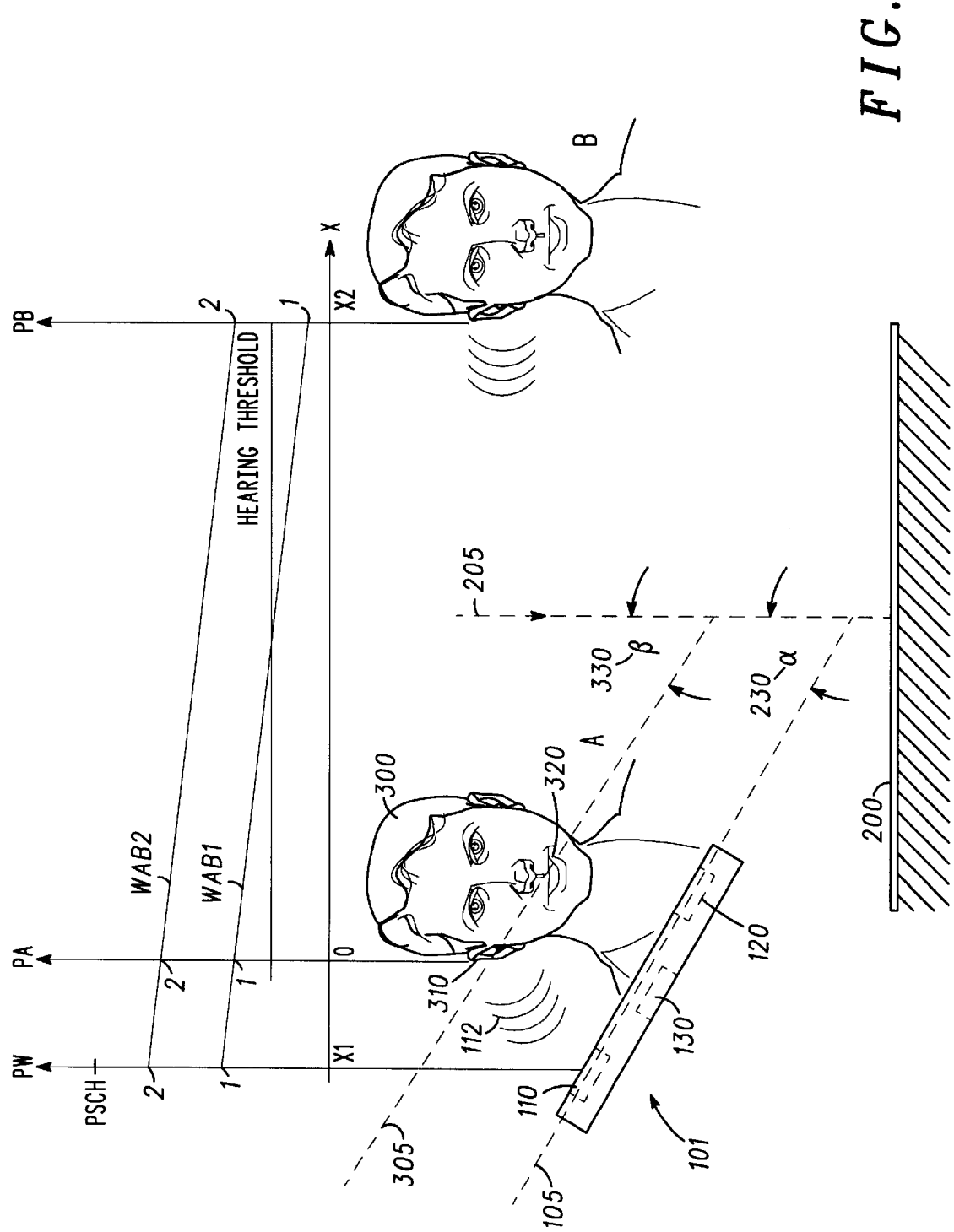
Figure 2:
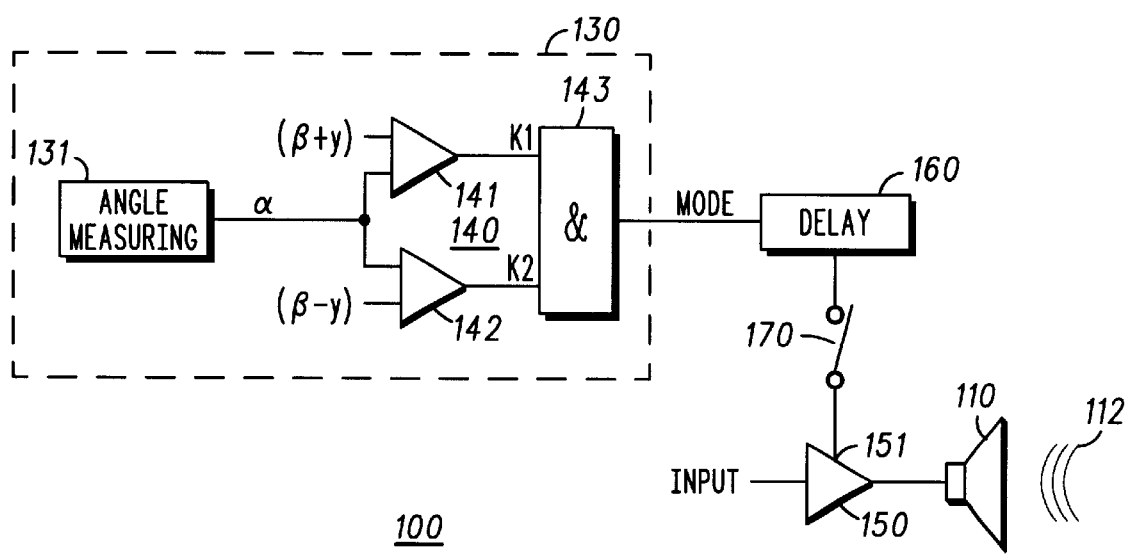

FIG. 1 shows a simplified representation of a communication device in a reference system according to the present invention; users A and B of the communication device; and simplified diagrams of the occurring sound levels; and FIG. 2 shows in a simplified representation a block diagram of the communication device of FIG. 1 in a preferred embodiment of the present invention.

DETAILED DESCRIPTION OF THE DRAWINGS

The present invention describes a dual mode device for which the switch-over between the operating modes is performed automatically in relation to a reference system (e.g., the gravitation field of the earth with plumbing gradients), which is independent of the user and the device itself.

In comparison to the prior art, where the switch-over is determined by the distance and therefore by the space between the user and the device, the present invention does not need to consider environmental influences, since the reference system operates both on the device and the user in the same way.

FIG. 1 shows a simplified representation of the communication device 100 according to the present invention, in reference system 200/205; user A (300) and user B (400) of the communication device; and simplified diagrams of the occurring sound levels P (PW, PA, PB).

Communication device 100 (referred to hereinafter as "device 100") comprises an electro-acoustic converter 110 (e.g., an earpiece or a loudspeaker), location sensor 130 (also "position sensor" or "plumbline sensor") and, optionally, acoustic-electrical converter 120 (e.g., a microphone). Connecting line 105 (dashed) between converter 110 and microphone 120 is an example of the extension of this device in a spatial dimension. Person A can hold device 100 in the hand. This is not necessary, however. The position of device 100 as shown in FIG. 1 (and thus line 105) which is near to the head of the user, on the left hand side, is just an example and is not limited thereto. Device 100 can actually be used in many other positions which are within or outside an area which can be reached by hand by the person using it.

Converter 110 sends information as an acoustic signal 112 to the first person A (300) and also, temporarily, to a second person B (400). Signal 112 reaches person 400 in an attenuated form (112'). To help to understand this invention it will be assumed that the information is supplied by person C, not shown here, or from a speaking computer that is in communication with device 100 (e.g., over radio or a telephone line, e.g., with information signal 101). The communication between person A and B and person C is not part of the present invention and will be thus not be discussed. When viewing along an X-axis, the ear (310) of person A is in position X=0, and the ear (410) of person B is in position X=X2. Converter 110 will be viewed as a point sound source in position X1. In other words, the distance from converter 110 to the ear of person A is X1 (e.g., 0 to a few centimeters), the distance to the ear of person B is X2+X1 (X2>>X1, up to a few meters). Distance X1 can be ignored in the following ("in the immediate vicinity"), whereas the distance X2 between the two persons A and B is considered to be predetermined.

FIG. 1 shows reference system 200/205 using the gravitational field of the earth as an example. Gravitation gradient 205 (also the "plumbline") is shown in FIG. 1 as a dashed line pointing downwards. Gradient 205 corresponds to the directed earth's attraction force G (compare the vector of the gravitation coefficient g multiplied by the mass m of an object). In simplified representation, the earth's surface 200 is shown as the horizontal plane (perpendicular to 205), but this is not essential for the invention. Further reference systems will be described later.

Connecting line 305 between the ear (310) and the mouth (320) of person A creates a substantially constant angle β (330) to the plumbline 205 (the angle of plumb). One will assume, for explaining the present invention, that person A's head is in an upright position (person A is sitting or standing). This is, however, not necessary for the present invention. Angle β could, for example, also be determined for a person who is lying down.

The angle of plumb β would stay basically constant, even if person A would turn the head to the left or to the right. Using a tolerance angle of γ, a set of angles {β} is established. The set which covers all angles in the range from $$(\beta-\gamma)\approx 30° \text{ to } (\beta+\gamma)\approx 60°: \{\beta\}=(\beta-\gamma)\ldots(\beta+\gamma) \quad (1)$$

The numeric values given here are related to the example and can vary.

As mentioned above, the connecting line 105 (e.g., converter/microphone) can assume any position. Line 105 creates an angle of plumb α to gradient 205 (0°≦α≦90°). According to a method of the present invention, sensor 130 determines the angle α, compares α with {β} and switches device 100 between at least two operating modes, depending on the results of the comparison.

The first operating mode "QUIET" (1) serves above all for the transmission of confidential information (from C) to an authorized person A (e.g., C: "your bank account has the following balance . . . "), whereby person B is not allowed to listen (from converter 110). Sensor 130 switches device 100 into the QUIET operating mode when device 100 is in such a position in relation to reference system 200/205 that (β−γ)≦α=α≦(β+γ) is valid. The present invention uses the fact that persons who make a phone call (here: A), in the operating mode QUIET, hold the hand set (here: device 100) substantially at a predetermined angle (α∈{β}, "∈" for "element of"). In other words, when device 100 is in a position corresponding to that by which person A would held device 100 to the ear (310) (β±γ), device 100 goes into QUIET mode.

It is not required that person A really holds device 100 to the ear (310). It is sufficient to place device 100 into an appropriate position relative to the reference system.

The second operating mode "LOUD" (2) serves to transmit information to A as well as to B (e.g., "A storm warning is being issued for the North Sea . . . "). When angle α is not within the predetermined angle set (α∉{β}, then device 100 switches over to the second operating mode LOUD.

To give a more precise distinction between the two operating modes it is useful to look at the diagrams for the occurring sound levels, also shown in FIG. 1. The term "sound level" is used here to represent "sound pressure level", "sound power level" or other measurements of acoustic energy present.

Using index "1" FOR "QUIET" and index "2" for "LOUD", the diagrams show the sound level "PX" generated by converter 110 (for X=X 1), the sound level "PA" received by person A (at X=0), as well as the sound level "PB" received by person B (at X=X2). Lines WAB1 and WAB2 between the diagrams show the drop in sound level with increasing distance. The simplified diagrams serve to show a qualitative (larger, smaller, equal sized) representation of the magnitude relations and do not take care about the real level relations, scaling or the quadratic form of the sound level functions.

"DA" is the air attenuation factor over the distance X1 (converter 110 to person A). "DB" is the air attenuation factor over the distance X1+X2 (converter 110 to person B) who is located at a certain predetermined minimum distance X2 from person A. "PSA" is the hearing threshold of person A. "PSB" is the hearing threshold of person B, whereby one can usually assume that PSA=PSB=PS. The following is valid for operating mode QUIET:

$$(\alpha\in\{\beta\} \quad (2)$$

PW/DA≦PSA (A can hear, "/" for division)

PW*DB<PSB (B cannot hear)
Line WAB1 crosses over PS.
The following is valid for operating mode LOUD:

$$(\alpha\notin\{\beta\} \quad (3)$$

PW DA>PSA(A can hear)
PW*DB>PSB (B can also hear)

The hearing threshold PS can be defined as an absolute hearing threshold or as a relative hearing threshold in relation to the occurring ambient noise. Depending on the sound level of the converters' acoustic signals and that of the ambient sounds, the signals will be understood or not understood.

The air attenuating factor PSA can usually be taken as 1 (or 0 dB) (converter 110 at the ear of person A). It is useful when the sound level is, from the very beginning, kept below the pain threshold (PSCH) i.e. (PX<PSCH). Level limiters are state-of-the-art and will not be described any further here.

Communication device 100 may, for example, be a radio device or a mobile telephone. In a typical application, to which the invention is in no way limited, person A puts device 100 to the ear (or in a parallel position) and can telephone in QUIET mode without having to activate any operating elements beforehand.

FIG. 2 shows a simplified representation of a block diagram for the communication device 100, according to FIG. 1, in a preferred embodiment of the present invention. Device 100 is shown with sensor 130 (dashed frame), converter 110 (loudspeaker symbol) as well as controllable amplifier 150 and optional delay gate 160. Sensor 130 comprises angle measuring device 131, comparators 141 and 142, and AND-gate 143.

Angle measuring device 131 measures angle α and sends a signal representing angle α to comparators 141 and 142. Comparator 141 checks α against an upper limit value (β+γ) and provides a digital signal K1 where:

$$K1=\text{TRUE for } \alpha\leq(\beta+\gamma) \quad (4)$$

$$K1=\text{FALSE for } \alpha>(\beta+\gamma) \quad (5)$$

Comparator 142, in a similar way, checks α against a lower limit value (β−γ) and provides a digital signal K2 where:

$$K1=\text{TRUE for } \alpha\leq(\beta-\gamma) \quad (6)$$

$$K1=\text{FALSE for } \alpha<(\beta-\gamma) \quad (7)$$

AND-gate 143 connects K1 and K2 together and generates digital signal MODE:

$$\text{MODE}=K1 \text{ AND } K2 \quad (8)$$

$$\text{MODE}=\text{TRUE for } (\beta-\gamma)\leq\alpha\leq(\beta+\gamma) \quad (9)$$

$$\text{MODE}=\text{FALSE for the other cases} \quad (10)$$

MODE=TRUE represents "QUIET" and MODE=FALSE represents "LOUD". Sensor 130 transmits MODE to control input 151 of amplifier 150 which amplifies input signal INPUT (e.g., speech from C) and passes it on to converter 110 (acoustic signal 112) in such a way that the sound level PX for MODE=TRUE equals PX1 and that for MODE= FALSE, PX, equals PX2>PX1.

Delay gate 160 can be provided to avoid any abrupt change from QUIET to LOUD (and vice versa). For example, delay gate 160 can transfer signal MODE=FALSE to amplifier 150, only after a time period which is sufficient for converter 100 to be taken away from the ear.

Switch 170 symbolizes the possibility of manual adjustment to the operating mode to be carried out. Device 100 will, in a first setting (MODE=TRUE), find itself permanently in the operating mode QUIET and will find itself in a second setting (MODE=FALSE) in the operating mode LOUD, and in a third setting the operation mode will be set by sensor 130 according to the present invention.

Location sensors are known to a person of skill in the art. For example, a known micro-mechanical sensor element with a spring mass system made out of silizium and a digital analysis circuit can be used.

The person of skill in the art will be in a position to undertake modifications without departing from the present invention. Controllable amplifier 150 and converter 110 can, for example, be replaced by an arrangement of a selective (MODE) controllable telephone earpiece ("QUIET") and loudspeaker ("LOUD"). The illustration of sensor 130 as an electrical circuit diagram simply is only provided for explanation and is not limited to this. Sensor 130 can, for example, be mechanically so designed that it can generate signal MODE without any further electrical connection.

Optionally, the angle set {β} can also be adjusted depending on the telephone habits of person A. A preferred operating mode can be set (default QUIET or default LOUD) when switching on device 100 or in a standard situations during operation (e.g., reset, creating a speech connection). Or, for example, operating mode LOUD can be limited to α=90° (vertical). There is also an option whereby it is possible to arrange the changeover of sound levels smoothly (i.e. fading in and fading out), despite the fact that the two operating modes are described as QUIET and LOUD, which will further increase the level of comfort when using a device 100 based on the invention presented here.

The described above usage of the gravitational force as a reference system substantially considers zenith angles (α and β). In other reference systems (e.g., the magnetic field of the earth, time signal transmitter DCF-77, the compass direction), it is also possible to consider azimuth angles. Combinations of zenith and azimuth angles are also possible.

The present invention has been explained in terms of angle coordinates, but this does not limit its range of application. Other coordinates (e.g., XYZ, height) can also be used.

The person of skill in the art will also be able of implementing device 100 by other means (e.g., the use of microprocessors) without the need of further explanations.

The present invention can also be described as a method for operating communication devices (e.g., device 100). The method is characterized by the following method steps:

(a) determining the position 230 of device 100 with reference to an independent system 200 (independently both of device 100 and of its user, person A);

(b) using device 100 in the first operating mode (e.g., QUIET), when position 230 corresponds to a predetermined position set 330 (see, for example, angles α and γ);

(c) using device 100 in the second operating mode (e.g., LOUD) when position 230 no longer corresponds to the predetermined position set 330;

Device 100 can, as described above, receive an information signal 101 in step (b) and transmit it via an electro-acoustical converter 110, with an initial sound level of PW1, and in step (c) receive an information signal 101 and transmit it via converter 110 (or via another converter) with a second sound level of PW2. Preferably, device 100 receive substantially the same information signal 101 in both steps (b) and (c). In other words, it is not necessary for signal 101 to be a control signal by which the operating mode is switched.

Having described the invention in detail above, the present invention is now summarized as a portable communication device (100) with an electro-acoustic converter (110) for the transmission of information to a first person (300), said communication device (100) being switchable from (i) a first operating mode in which said converter (110) transmits the information at such a level (PW1) that the information can reach said first person (300) at a sound level (PA1), which is at or above the hearing threshold (PA1>PS) and can reach a second person (400) only at a sound level (PB1) which is below the hearing threshold (PB1<PS) to (ii) a second operating mode in which said converter (110) transmits the information at such a level (PW2) that it can reach said first person (300) at a sound level (PA2) which is at or above the hearing threshold (PA2>PS) and which can also reach a second person (400) at a sound level (PB2) which is also at or above the hearing threshold (PB2≧PS), said communication device (100) being characterized by a location sensor (130) which switches the communication device (100) into the first operating mode when the communication device (100) is—in relation to a reference system which is independent of the communication device (100)—located in a position ((β−γ) ≦α≦(β+γ)) which corresponds to the condition as if said first person (300) were to hold the communication device to the ear (310) (β+γ), and which otherwise switches over to said second operating mode.

While the invention has been described in terms of particular structures, devices and methods, those of skill in the art will understand based on the description herein that it is not limited merely to such examples and that the full scope of the invention is properly determined by the claims that follow.

What is claimed is:

1. A communication device comprising:
   an electro-acoustic converter;
   a microphone; and
   a sensor for determining the device position in relation to an independent system,
   wherein the communication device at positions that correspond to a predetermined position set is operated in a first mode to provide acoustic signals which can only be understood by a first person who is located in immediate vicinity to said converter, wherein said predetermined position set corresponds to the angle of plumb at which said communication device is being held by said first person who brings said microphone to the mouth and said converter to the ear, and wherein the communication device at positions that do not correspond to said predetermined position set is operated in a second mode.

2. The communication device according to claim 1 where said sensor is responsive to the system of the earth gravitational force.

3. The communication device according to claim 1, wherein said predetermined position set is determined by an angle in the range from 30 degree to 60 degree to the angle of plumb.

4. The communication device according to claim 1 wherein switching over from said first mode to said second mode is delayed.

5. The communication device according to claim 1, wherein in said second mode, said converter generates acoustic signals which can be understood by said first person as well as by a second person located outside said vicinity.

6. The communication device according to claim 5 whereby said switching over into the second mode in which said second person can understand said acoustic signals is at least accompanied by a warning tone transmitted to said first person.

7. The communication device according to claim 1, wherein the function of said sensor can be disabled by a manual switch.

8. The communication device according to claim 1, wherein said sensor is responsive to zenith or azimuth angles or to combinations thereof.

9. The communication device according to claim 1 whereby (i) in said first mode, said converter transmits information at such a sound level that said information reaches said first person at a sound level which is at or above the hearing threshold and can only reach said second person at a sound level which is below the hearing threshold, and (ii) in said second mode said converter transmits said information at such a sound level that said information reaches said first person at a sound level which is at or above the hearing threshold and which can also reach said second person at a sound level which is at or above the hearing threshold, wherein said sensor switches said communication device into said first mode when said communication device is in a position relative to a reference system that is independent from said communication device, which corresponds to a situation, as if said first person would hold said communication device to the ear, and switch over to said second mode otherwise.

10. A radio with an earpiece in the operating modes LOUD and QUIET, as well as a microphone, comprising a location sensor which determines which of the two operating modes to operate in, based on an angle from a connecting line between said earpiece and said microphone to the earth gravitational field gradient.

11. The radio according to claim 10 wherein said location sensor sets the operating mode to LOUD when said connecting line basically coincides with said earth gravitational field gradient.

12. The radio according to claim 10 having a delaying gate located between said location sensor and said earpiece, which invokes switching over from QUIET to LOUD only when a predetermined time period has passed since the corresponding angle was reached.

13. A device with a converter, said converter generating an acoustic information signal with sound level (PW), said device further comprising a plumbline sensor coupled with said converter for determining the angle of plumb $\alpha$ of said device to the gravitational field, comprising:

the air attenuation factor (DA) over the distance between said converter and a person A, said person A holding the converter, the air attenuation factor (DB) over the distance between the converter and a person B, located at a predetermined minimum distance from person A, the hearing threshold of person A (PSA), the hearing threshold of person B (PSB), and the predetermined angle $\{\beta\}$ set with reference to the gravitational field, wherein:

for case 1, $\alpha \in \{\beta\}$: $PW/DA \leq PSA$ and $PW*DB < PSB$, and for case 2, $\alpha \notin \{\beta\}$: $PW/DA \leq PSA$ and $PW*DB \leq PSB$.

14. The device with converter according to claim 13, which is designed in such a way that a person A can hold the converter directly to the ear so that the air attenuation factor PSA is effectively PSA=1 (0 dB).

15. The device with converter according to claim 13, where PW is below the pain threshold (PSCH).

16. A portable communication device with which a first person perceives information provided by a first converter by an acoustic signal, wherein the signal, when operating in a first operating mode (1), can only be understood by said first person and not by a second person at a predetermined minimum distance from said first person, and wherein in a second operating mode (2), said signal can be understood by both said first person and said second person, said device being characterized by a sensor which analyses at least one coordinate of the spatial extension of said device in relation to a reference system which is independent of both said device and said person using it and which selects the coordinates according to the operating mode (1,2) of said device.

17. The device according to claim 16, for which the sensor, in relation to the gravitational field of the earth, determines the angle between said extension and plumbline.

18. The device according to claim 16, for which said sensor, in relation to the gravitational field of the earth, selects the first operating mode when a first angle between extension and plumbline substantially within the predetermined tolerance range corresponds to a line between the ear and the mouth of said first person.

* * * * *

UNITED STATES PATENT AND TRADEMARK OFFICE
CERTIFICATE OF CORRECTION

PATENT NO. : 6,510,326 B1
DATED : January 21, 2003
INVENTOR(S) : Martschink et al.

It is certified that error appears in the above-identified patent and that said Letters Patent is hereby corrected as shown below:

<u>Column 8,</u>
Lines 16 to 20, please change claim 13, from "the predetermined angle $\{\beta\}$ set with reference to the gravitational field; wherein:
    for case 1, $\alpha \in \{\beta\}$: PW/DA $\leq$ PSA and PW*DB $<$ PSB, and
    for case 2, $\alpha \notin \{\beta\}$: PW/DA $\leq$ PSA and PW*DB $\leq$ PSB." to
-- the predetermined angle $\{\beta\}$ set with reference to the gravitational field; wherein:
    for case 1, $\alpha \in \{\beta\}$: PW/DA $\geq$ PSA and PW*DB $<$ PSB, and
    for case 2, $\alpha \notin \{\beta\}$: PW/DA $\geq$ PSA and PW*DB $\geq$ PSB. --

Signed and Sealed this

Eighteenth Day of November, 2003

JAMES E. ROGAN
*Director of the United States Patent and Trademark Office*